(12) United States Patent
Koreeda

(10) Patent No.: US 6,667,821 B2
(45) Date of Patent: Dec. 23, 2003

(54) TWO-WAVELENGTH COMPATIBLE SCANNING LENS

(75) Inventor: Daisuke Koreeda, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/054,857

(22) Filed: Jan. 25, 2002

(65) Prior Publication Data

US 2002/0145789 A1 Oct. 10, 2002

(30) Foreign Application Priority Data

Feb. 1, 2001 (JP) ........................................ 2001-025205

(51) Int. Cl.[7] ............................................... G02B 26/08
(52) U.S. Cl. ........................................................ 359/205
(58) Field of Search ................................. 359/205, 206, 359/207, 216, 217, 218, 219, 565, 566, 568, 569, 570, 662, 741

(56) References Cited

U.S. PATENT DOCUMENTS

| 5,739,940 | A | 4/1998 | Kondo | 359/204 |
| 5,838,480 | A | 11/1998 | McIntyre et al. | 359/205 |
| 6,124,962 | A | 9/2000 | Kamikubo | 359/205 |
| 6,259,547 | B1 | 7/2001 | Kamikubo | 359/205 |
| 6,266,191 | B1 * | 7/2001 | Abe | 359/566 |

FOREIGN PATENT DOCUMENTS

| JP | 9-105877 | 4/1997 |
| JP | 10197820 | 7/1998 |

* cited by examiner

Primary Examiner—Euncha Cherry
(74) Attorney, Agent, or Firm—Greenblum & Bernstein, P.L.C.

(57) ABSTRACT

A scanning lens which converges a beam deflected by a deflector on a surface to be scanned, is provided with at least one refractive lens, and a diffractive lens structure formed on at least one surface of the at least one refractive lens. The scanning lens is configured to satisfy the following condition:

$$9.0 < fd/f < 17.0,$$

where fd is a focal length of the at least one diffractive lens structure, f is a focal length of the scanning lens as a whole including the at least one diffractive lens structure and the at least one refractive lens. Further, the scanning lens is configured so that lateral chromatic aberration is compensated for both of a first wavelength and a second wavelength which is different from the first wavelength.

4 Claims, 6 Drawing Sheets

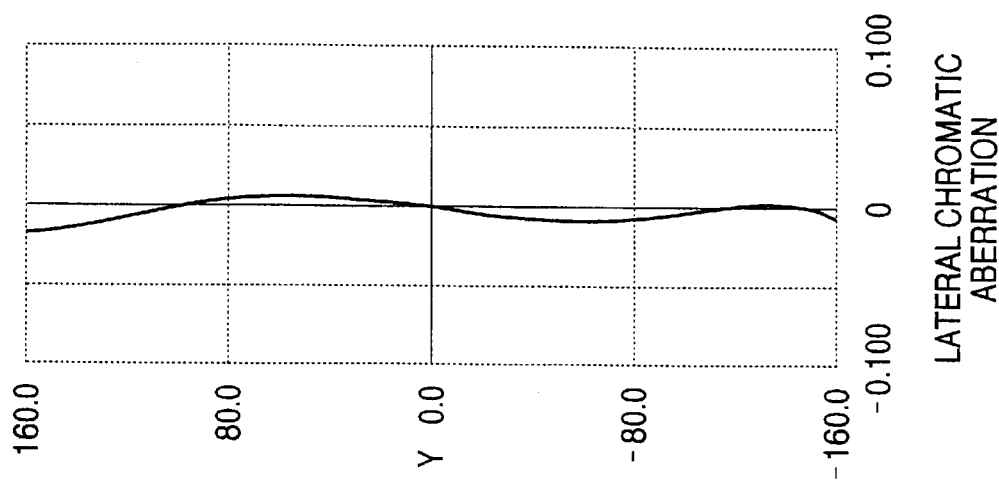
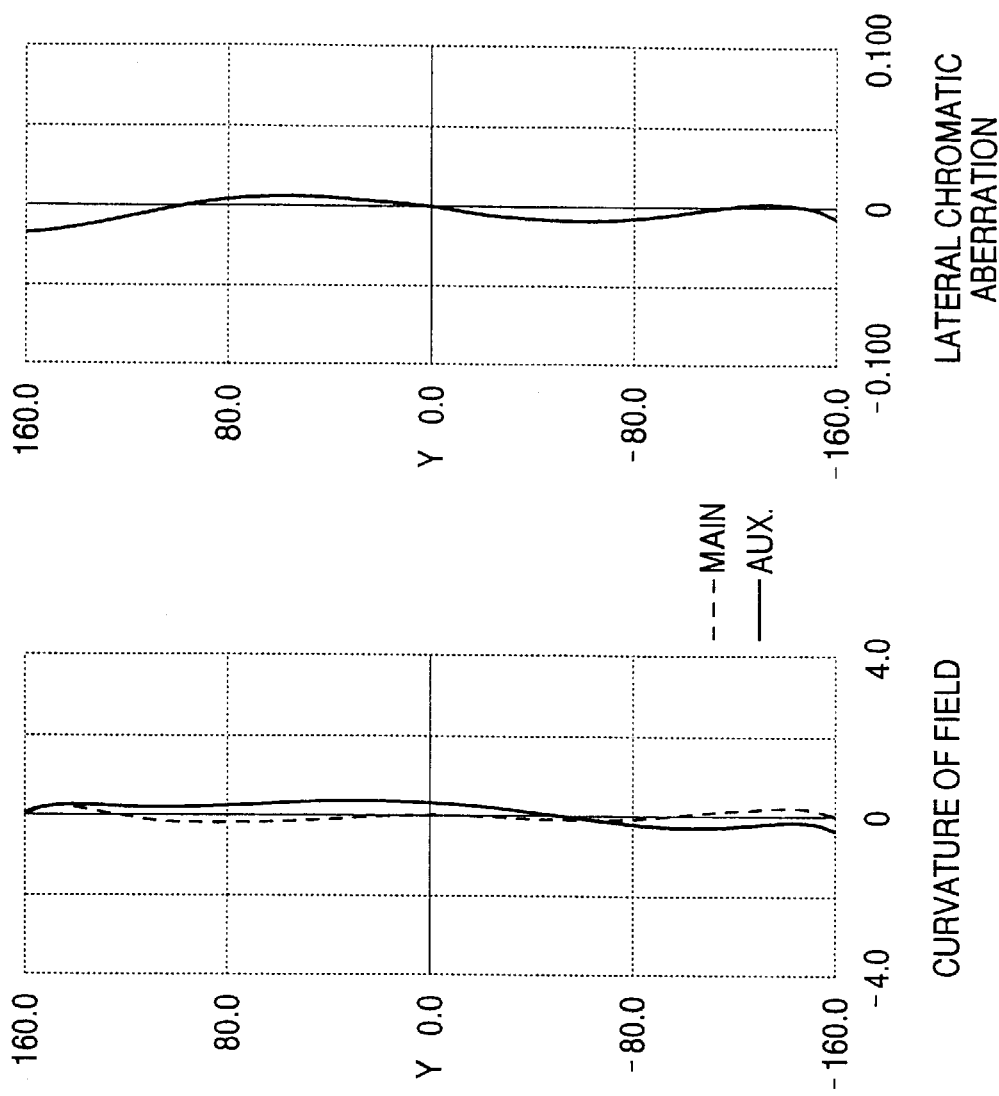
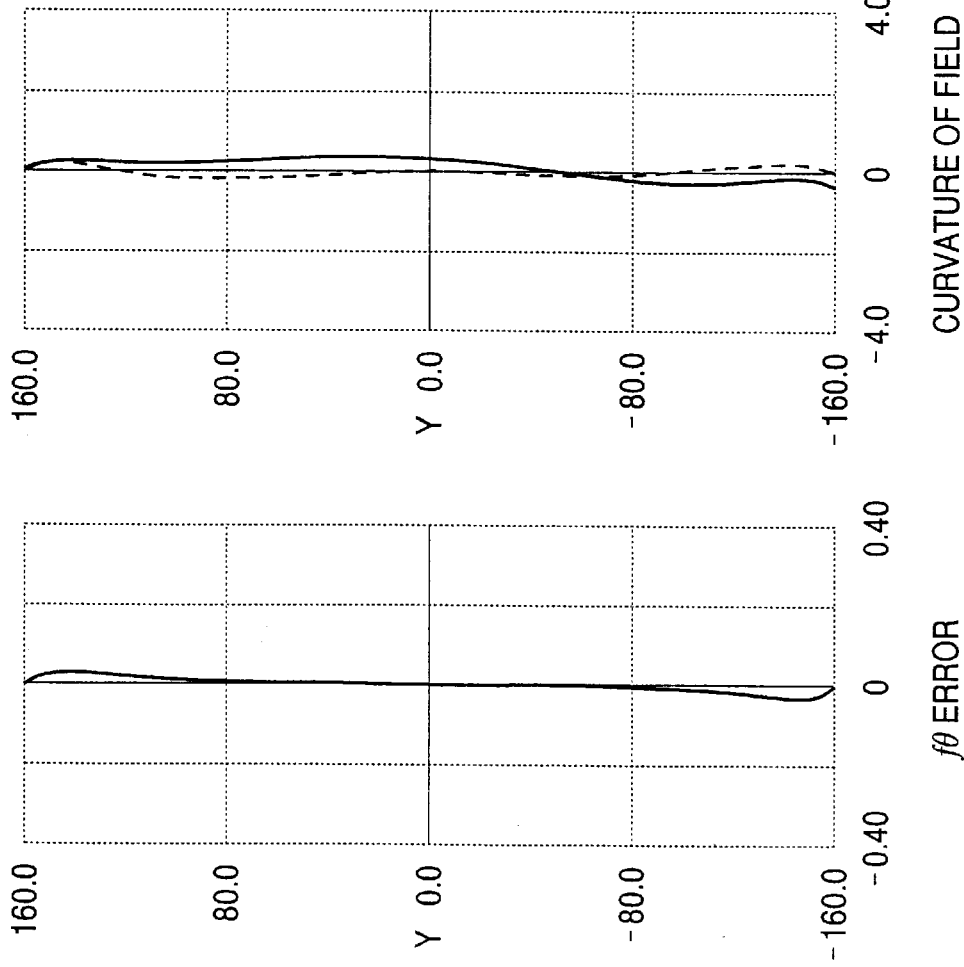

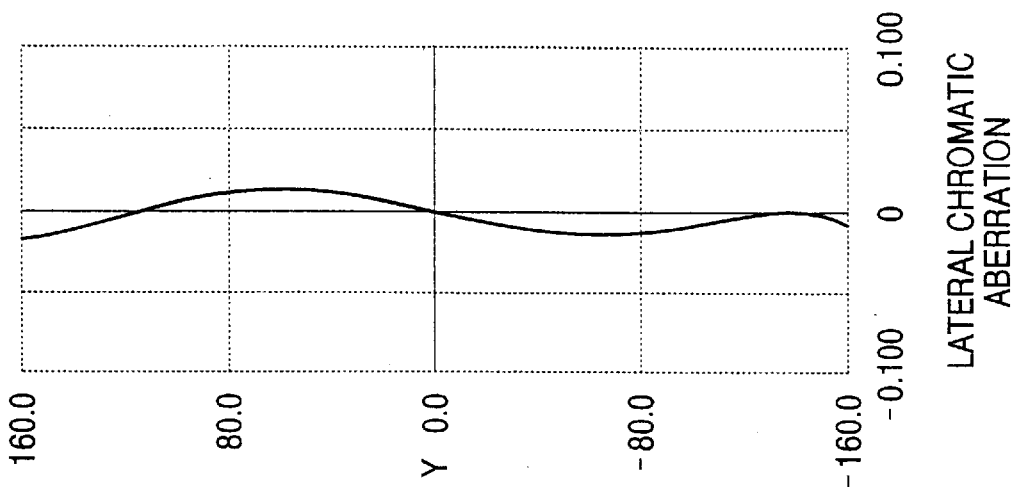
FIG.5A  FIG.5B  FIG.5C
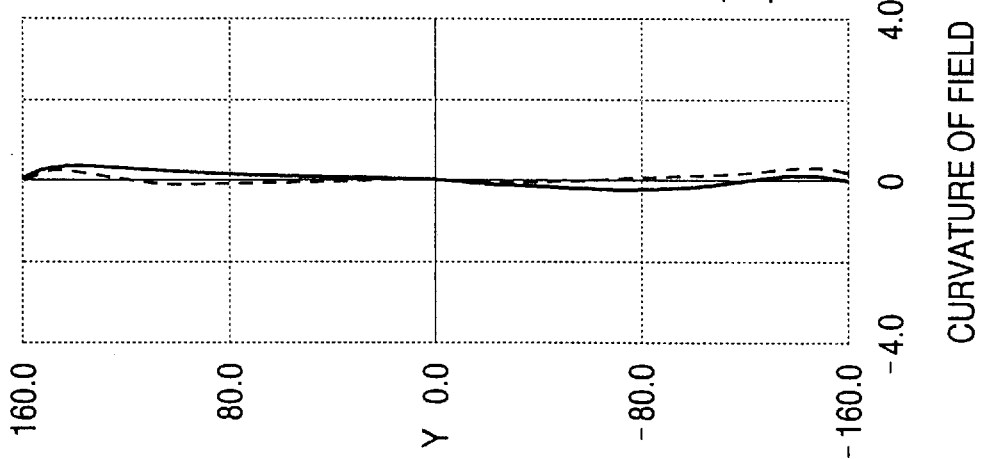
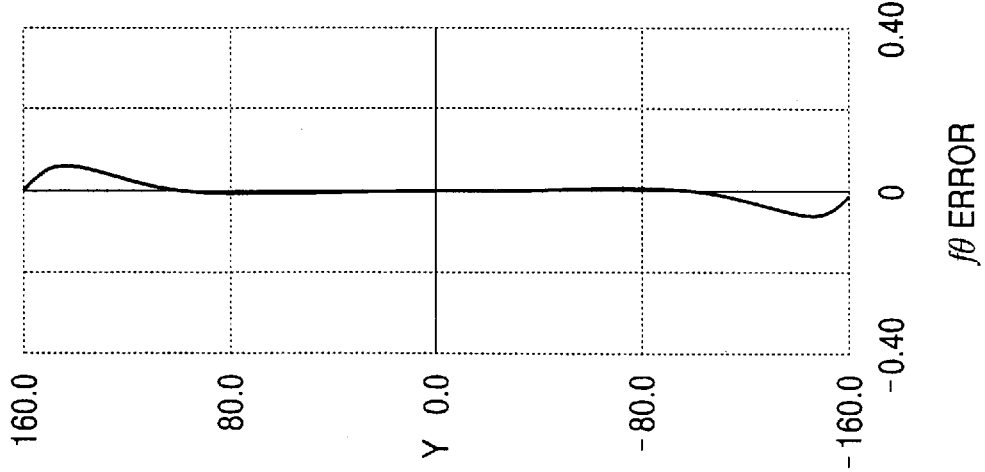

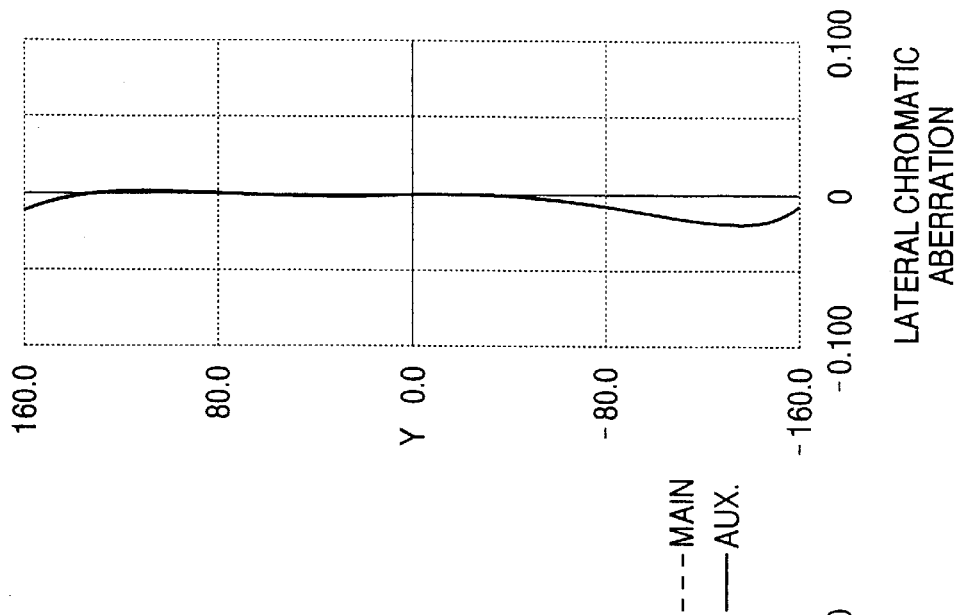
FIG.7A — fθ ERROR
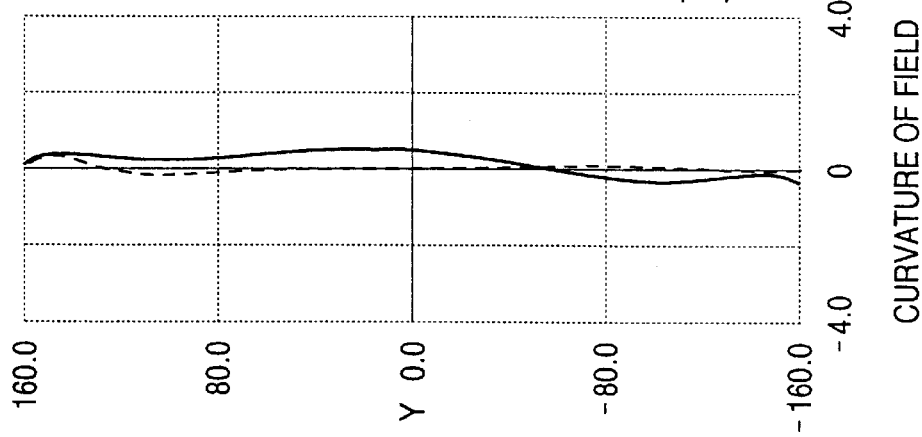
FIG.7B — CURVATURE OF FIELD
--- MAIN
—— AUX.
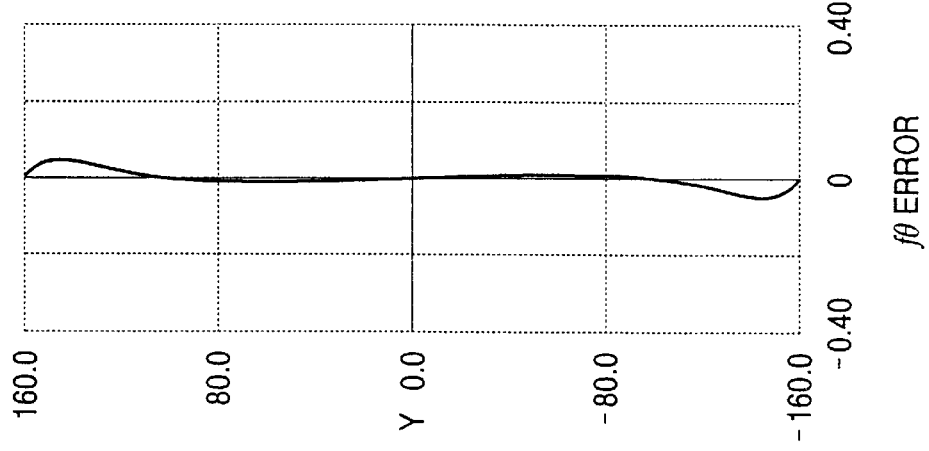
FIG.7C — LATERAL CHROMATIC ABERRATION

TWO-WAVELENGTH COMPATIBLE SCANNING LENS

BACKGROUND OF THE INVENTION

The present invention relates to a scanning lens for a scanning optical system used for a laser beam printer or the like, and particularly to a scanning lens that functions for two different wavelengths.

A scanning optical system is used for converging a scanning beam on a surface to be scanned. The scanning beam is typically configured such that a beam emitted by a laser source is deflected using a deflector such as a polygonal mirror, and the deflected beam is converged by an fθ lens to form a moving beam spot on the surface such as a circumferential surface of a photoconductive drum. As the polygonal mirror rotates, the beam spot formed on the photoconductive drum moves in one direction, which will be referred to as a main scanning direction. When the beam spots moves in the main scanning direction, the beam is ON/OFF modulated in accordance with an image to be formed. While the beam spot moves in the main scanning direction, the photoconductive drum is rotated (i.e., the surface is moved in an auxiliary scanning direction that is perpendicular to the main scanning direction). With the above configuration, a two-dimensional latent image is formed on the surface of the photoconductive drum.

A conventional scanning lens is designed to exhibit the best performance at a predetermined wavelength. If the wavelength of a beam actually used is different from the designed wavelength, its imaging performance is lowered.

Japanese Patent provisional publication HEI 10-197820 discloses a scanning optical system provided with a diffractive lens structure that compensates for a lateral chromatic aberration. With this scanning optical system, an effect of difference in wavelengths of laser source due to a manufacturing error of laser diodes is suppressed.

Japanese Patent provisional publication HEI 9-105877 teaches a scanning optical system provided with a diffractive lens structure that compensates for a longitudinal chromatic aberration. This scanning optical system is designed for a multi-beam scanning system, and an effect of a difference in wavelength between a plurality of beams is compensated.

In the JP provisional publication HEI 10-197820, the scanning optical system is designed to compensate for a deviation of a wavelength with respect a predetermined design wavelength. However, there is no disclosure regarding a condition required for a diffractive lens employed therein to compensate for a lateral chromatic aberration for two different wavelengths.

In JP provisional publication HEI 9-105877, the lateral chromatic aberration is not compensated for, therefore, and for beams having different wavelengths, scanning widths of scanning lines are different.

SUMMARY OF THE INVENTION

The present invention provides a scanning optical system that exhibits excellent imaging performance for two design wavelengths.

To provide the above advantage, a scanning lens which converges a beam deflected by a deflector on a surface to be scanned, is provided with at least one refractive lens, and a diffractive lens structure formed on at least one surface of the at least one refractive lens. The scanning lens is configured to satisfy the following condition:

$$9.0 < fd/f < 17.0,$$

where fd is a focal length of the at least one diffractive lens structure, f is a focal length of the scanning lens as a whole including the at least one diffractive lens structure and the at least one refractive lens. Further, the scanning lens is configured so that lateral chromatic aberration is compensated for both of a first wavelength and a second wavelength which is different from the first wavelength.

According to the invention, it becomes possible that the same scanning lens is used for both of the first wavelength and second wavelength. That is, at least for two design wavelengths, the same scanning lens can be used. Therefore, designing cost and manufacturing cost can be suppressed.

Optionally, the first wavelength is included in a red range, and the second wavelength is included in an infrared range. Further, a difference between the first and second wavelengths is substantially 100 nm or more.

Further optionally, Abbe number vd of the refractive lens, on which the at least one diffractive lens structure is formed, is greater than 50.

Furthermore, a blaze wavelength of the at least one diffractive lens structure λB satisfies the following condition:

$$\lambda 1 < \lambda B < (\lambda 1 + \lambda 2)/2,$$

where λ1 is the first wavelength, and λ2 is the second wavelength.

BRIEF DESCRIPTION OF THE ACCOMPANYING DRAWINGS

FIG. 1 schematically shows a plan view of a scanning optical system, including a scanning lens, according to a first embodiment;

FIG. 3A is a graph showing an fθ error of the scanning optical system according to the first embodiment;

FIG. 3B is a graph showing curvature of field of the scanning optical system according to the first embodiment;

FIG. 3C is a graph showing a difference between lateral chromatic aberrations for the first and second wavelengths of the scanning optical system according to the first embodiment;

Figure 4:
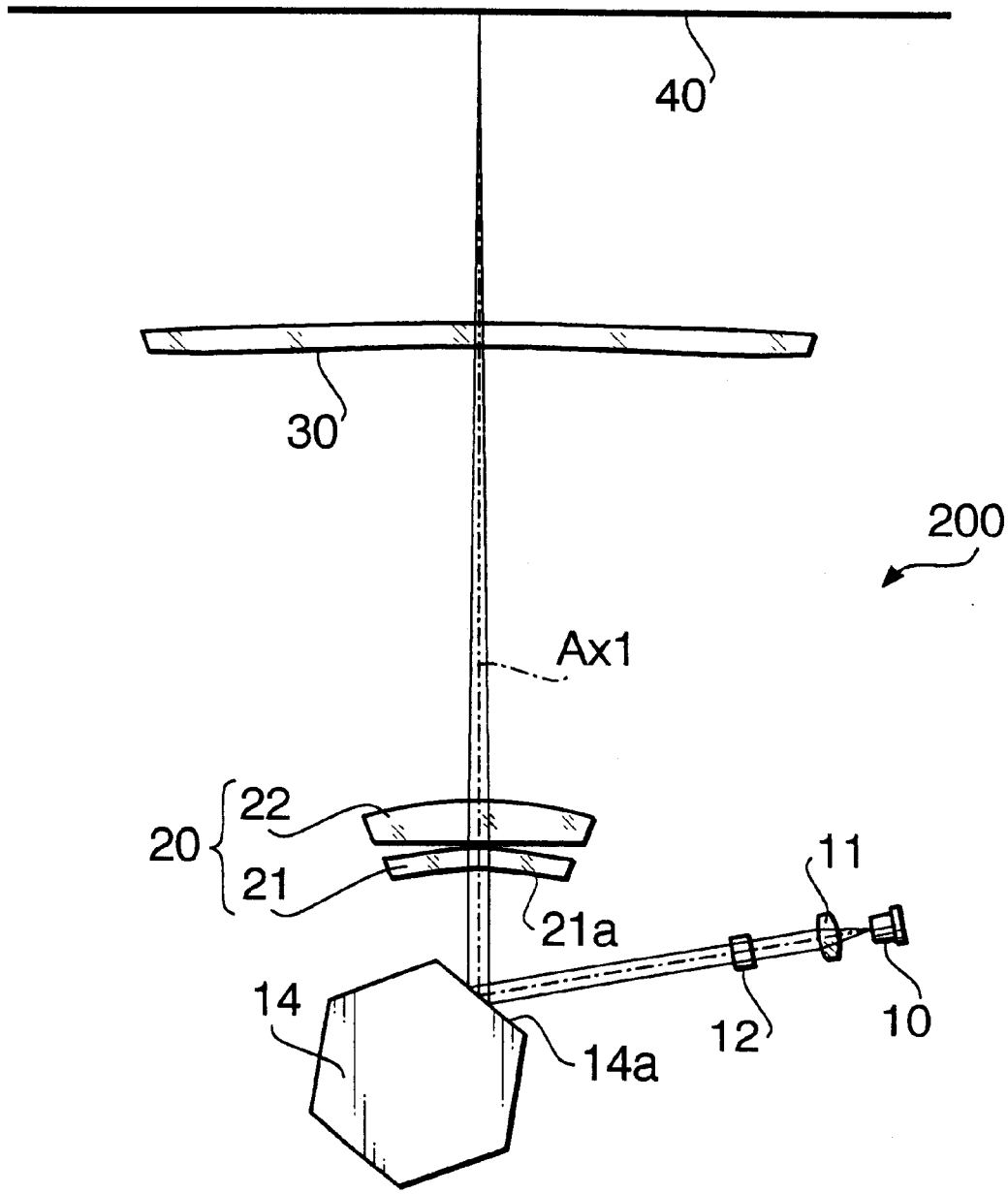
Figure 6:
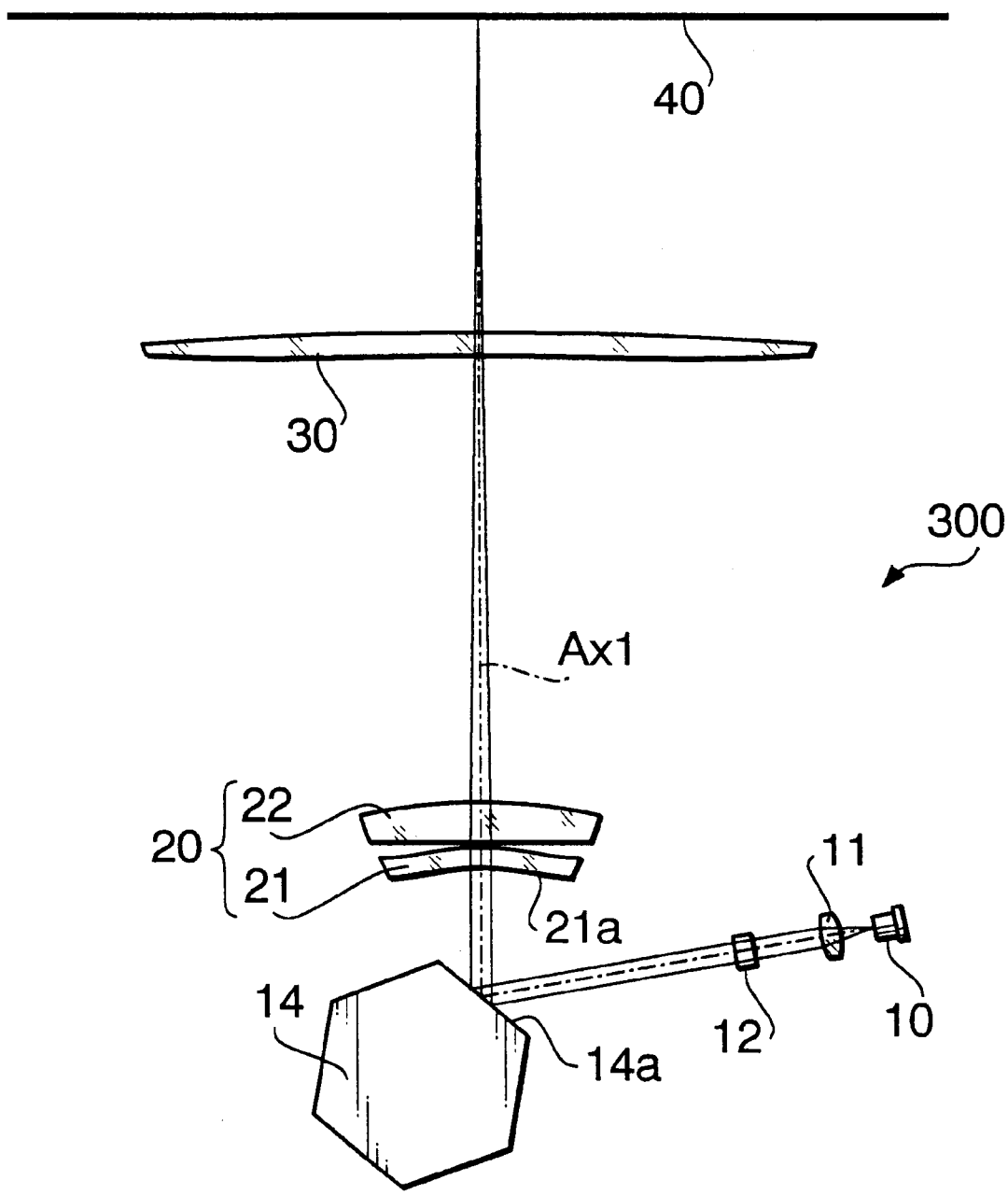

FIG. 4 schematically shows a plan view of a scanning optical system, including a scanning lens, according to a second embodiment;

FIG. 5A is a graph showing an fθ error of the scanning optical system according to the second embodiment;

FIG. 5B is a graph showing curvature of field of the scanning optical system according to the second embodiment;

FIG. 5C is a graph showing a difference between lateral chromatic aberrations for the first and second wavelengths of the scanning optical system according to the second embodiment;

FIG. 6 schematically shows a plan view of a scanning optical system, including a scanning lens, according to a third embodiment;

FIG. 7A is a graph showing an fθ error of the scanning optical system according to the third embodiment;

FIG. 7B is a graph showing curvature of field of the scanning optical system according to the third embodiment; and FIG. 7C is a graph showing a difference between lateral chromatic aberrations for the first and second wavelengths of the scanning optical system according to the third embodiment.

DETAILED DESCRIPTION OF THE EMBODIMENTS

Described below are, three embodiments of scanning optical systems each of which employs a scanning lens that functions for either of two beams having different wavelengths.

Each of the scanning optical systems according to the embodiments is used for a laser scanning unit of a laser beam printer. That is, the scanning optical system emits a scanning beam which is ON/OFF modulated in accordance with image data. The scanning beam forms a beam spot on a uniformly charged circumferential surface of a photoconductive drum of the laser beam printer to form a latent image.

A direction in which the beam spot moves on the photoconductive drum will be referred to as a main scanning direction. Further, a direction perpendicular to the main scanning direction, i.e., a tangential direction to the photoconductive drum on a scanning line will be referred to as an auxiliary scanning direction.

In the following description, a direction of a power of each lens, shape of each optical element and the like will be explained in relation to the main and auxiliary scanning directions on the photoconductive drum. Further, a main scanning plane will be defined as a plane which is parallel with the main scanning direction, and includes the optical axis of the scanning lens.

First Embodiment

Figure 1:
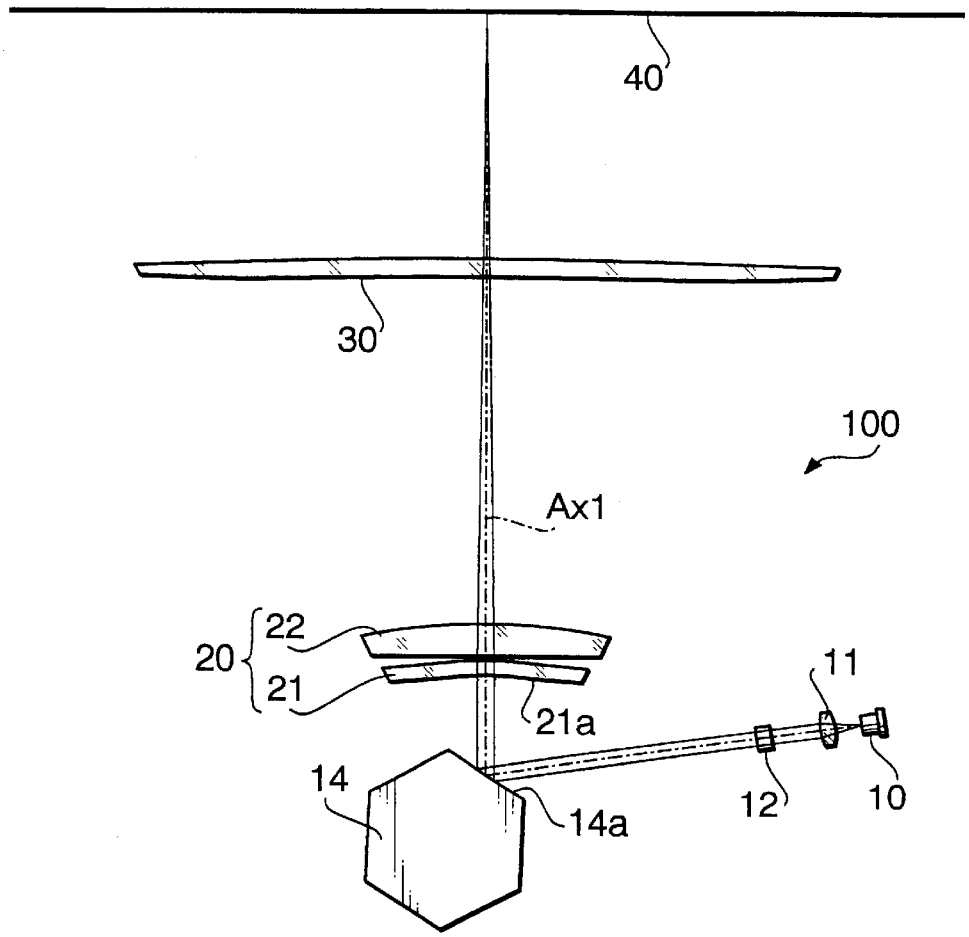

FIG. 1 schematically shows a plan view of a scanning optical system 100, including a scanning lens, according to a first embodiment.

The scanning optical system 100 includes a laser diode 10, a collimating lens 11, a cylindrical lens 12, a polygonal mirror 14, an fθ lens 20 and a compensation lens 30. The fθ lens 20 and the compensation lens 30 constitute the scanning lens. The scanning optical system 100 emits a scanning beam which forms a beam spot scanning in a main scanning direction on a surface 40 to be scanned.

Specifically, a diverging laser beam emitted by the laser diode 10 is collimated by the collimating lens 11. The collimated laser beam is incident on the polygonal mirror 14 via the cylindrical lens 12 which has a positive power only in the auxiliary scanning direction. The laser beam is deflected by reflecting surfaces 14a of the polygonal mirror 14. The deflected laser beam is converged, via fθ lens 20 and the compensation lens 30, on the surface 40.

The cylindrical lens 12 is configured such that a collimating lens side surface is formed as a cylindrical surface having positive power only in the auxiliary scanning direction, and that a polygonal mirror side surface is a planner surface. The power of the cylindrical surface is designed such that a line-like image is formed in the vicinity of a reflection surface 14a of the polygonal mirror 14.

The laser beam reflected by the polygonal mirror 14 proceeds as parallel light fluxes in the main scanning direction and as diverging light in the auxiliary scanning direction, and is incident on the fθ lens 20.

The fθ lens 20 includes a first lens 21 and a second lens 22 arranged in this order from the polygonal mirror side 14. A polygonal mirror side surface of the first lens 21 is formed with a diffractive lens structure 21a which functions to compensate for a lateral chromatic aberration.

The compensation lens 30 is elongated in the main scanning direction, and arranged closer to the surface 40. The compensation lens 30 functions to compensate for curvature of field. An fθ lens side surface of the compensation lens 30 is an anamorphic surface having a strong positive power in the auxiliary scanning direction, and the effective refractive power thereof in the auxiliary scanning direction reduces from the center to peripheral side in the main scanning direction. The light beam passed through the compensation lens 30 converges in the main and auxiliary scanning directions, and forms a beam spot on the surface 40 to be scanned.

According to the first embodiment, the scanning lens has a positive power as a whole, and is a two-wavelength compatible lens that is optimized for both a laser beam having a first wavelength, which is included in a red range, and another laser beam having a second wavelength, which is included in an infrared range.

Figure 2:
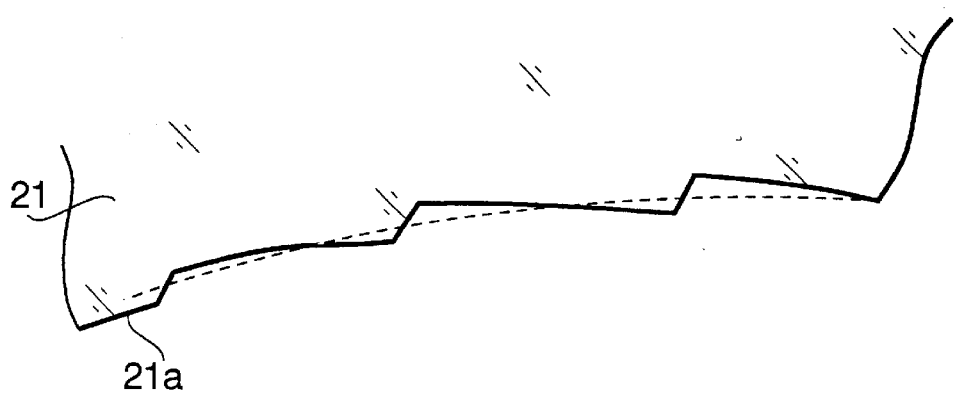
FIG. 2 is a cross sectional view of a diffractive lens structure employed in the scanning optical system shown in FIG. 1.

FIG. 2 is a cross sectional view of a diffractive lens structure formed on the surface 21a of the fθ lens 20. A macroscopic shape of the diffractive lens structure is indicated by broken lines, and the microscopic shape (i.e., an actual shape) of the structure is indicated by a solid line in FIG. 2.

The fθ lenses described hereinafter are designed to satisfy the following conditions.

$$9.0 < fd/f < 17.0 \quad (1)$$

$$vd > 50 \quad (2)$$

$$\lambda 1 < \lambda B < (\lambda 1 + \lambda 2)/2 \quad (3)$$

where, fd represents a focal length of the diffractive lens structure, f represents a focal length of the scanning lens including both the refractive and diffractive lens structures, vd is Abbe number of the refractive lens on which the diffractive lens structure is formed, λB is a blaze wavelength of the diffractive lens structure, λ1 is the first wavelength, and λ2 is the second wavelength.

Condition (1) defines a ratio of the power of the diffractive lens structure to the power of the scanning lens as a whole. When condition (1) is satisfied, at each of the first and second wavelengths, the lateral chromatic aberration is compensated and a desired performance can be obtained. If the ratio (fd/f) is lower than the lower limit (i.e., 9.0), the lateral chromatic aberration is overcompensated, while if the ratio is greater than the upper limit (i.e., 17.0), the lateral chromatic aberration is less compensated.

Condition (2) defines the Abbe number of the refractive lens on which the diffractive lens structure is formed. It is known that the diffraction efficiency becomes greatest when an optical path difference provided by steps of the diffractive lens structure is an integer multiple of a wavelength. Therefore, in order to achieve a high diffractive efficiency, it is preferable that a first optical path difference for the first wavelength and a second optical path difference for the second wavelength are as close as possible. Accordingly, the refractive lens on which the diffractive lens structure is formed is made of material whose refractive index changes little even if the wavelength of light passes therethrough changes, and thus, it is preferable that material which satisfies condition (2) is used.

Condition (3) defines the blaze wavelength of the diffractive lens structure. The diffraction efficiency becomes the greatest at the blaze wavelength λB, and decreases as the wavelength is apart (i.e., greater or lower) from the blaze wavelength. Therefore, in order to achieve a sufficiently high diffraction efficiency for each of the first wave length λ1 and the second wave length λ2, the blaze wavelength λB should be determined to satisfy condition (3). If the blaze wavelength λB is smaller than the lower limit of condition (3), the diffraction efficiency for the second wavelength λ2 is lowered, while if the blaze wavelength λB is greater than the upper limit of condition (3), the diffraction efficiency for the first wavelength λ1 is lowered.

A diffractive lens surface is generally expressed by SAG (h), which is defined as a distance from a plane tangent to the diffraction surface at the optical axis Ax1 from a point on the diffractive lens, whose height from the optical axis Ax1 is h. The SAG amount SAG(h) is defined as follows.

$$SAG(h)=X(h)+S(h)$$

where, X(h) expresses a base curve (i.e., a macroscopic shape) of the diffractive surface, and is defined as follows.

$$X(h) = \frac{h^2}{r\left(1 + \sqrt{1 - \frac{(\kappa+1)h^2}{r^2}}\right)} + A_4 h^4 + A_6 h^6 + A_8 h^8 + A_{10} h^{10} \quad (i)$$

In the above expression, r represents a radius of curvature, κ represents a conical coefficient, and $A_4$, $A_6$, $A_8$ and $A_{10}$ are 4th, 6th, 8th and 10th aspherical coefficients, respectively.

An optical path length additional amount Δφ(h) is defined by the following equation.

$$\Delta\phi(h)=P_2 h^2 + P_4 h^4 + P_6 h^6 + P_8 h^8 + P_{10} h^{10} \quad (ii)$$

where, h represents a height with respect to the optical axis Ax1, Pn represents an optical path difference function coefficient of n-th order.

A term S(h) in the SAG equation (i) is obtained based on the optical path length additional amount Δφ(h) as indicated below.

$$S(h)=\{|MOD(\Delta\phi(h)+C,-1)|-C\}\lambda/(n-1+Dh^2) \quad (iii)$$

where, MOD(X,Y) is a modulo function which gives a remainder of X subtracted by Y, and C is a coefficient defining a phase of a boundary of annular zones. C could be any value between 0 and 1, and C=0.5 in each embodiment described herein. D represents a compensation coefficient which is used to compensate for a change of an additional amount of a phase due to inclination of the beam with respect to the diffractive lens surface 21a.

An order number N of each zone of the diffractive lens surface is represented by the following formula, with the area on the optical axis defined as N=0.

$$N=INT(|\Delta\phi(h)+C|) \quad (iv)$$

where, INT(X) is a function that gives an integer portion of X.

Numerical Structure

A numerical example of the scanning optical system according to the first embodiment is described.

TABLE 1 indicates a numerical structure of the scanning optical system 100, from a cylindrical lens 12 to the surface 40 to be scanned. A symbol f in the table represent a focal length of the scanning lens in the main scanning direction, ry represent a radius of curvature of each optical element in the main scanning direction, rz represents a radius of curvature of each optical element in the auxiliary scanning direction (omitted if the surface is rotationally symmetrical), d represents a distance between adjoining surfaces on the optical axis Ax1, nλ represents a refractive index at a wavelength of λ nm. In the example shown in TABLE 1, the first wavelength λ1 is 680 nm, and the second wavelength λ2 is 780 nm.

In TABLE 1, surfaces #1 and #2 represent the cylindrical lens 12, a surface #3 represents a reflection surface 14a of the polygonal mirror 14, surface #4 and #5 represent the first lens 21 of the fθ lens 20, surface #6 and #7 represent the second lens 22 of the fθ lens 20, and surfaces #8 and #9 represent the compensation lens 30.

TABLE 1 f: 280.0 mm    scanning width: 320 mm

| Surface number | ry | rz | d | n780 | n680 |
|---|---|---|---|---|---|
| #1 | inf. | 50.0 | 4.00 | 1.51072 | 1.51315 |
| #2 | inf. | — | 97.00 | | |
| #3 | inf. | — | 46.00 | | |
| #4 | −92.30 | — | 7.00 | 1.48617 | 1.48849 |
| #5 | −91.30 | — | 2.00 | | |
| #6 | inf. | — | 15.00 | 1.51072 | 1.51315 |
| #7 | −161.90 | — | 165.20 | | |
| #8 | −1366.80 | 39.92 | 8.00 | 1.48617 | 1.48849 |
| #9 | −1878.00 | — | 112.80 | | |

Surface #1 is a cylindrical surface, surface #2, #3, #6 are planner surfaces, and surfaces #7 and #9 are spherical surfaces. Surface #5 is a rotationally symmetrical aspherical surface, whose shape is expressed by equation (i) above. The conical coefficient and the spherical coefficients for the surface #5 are indicated in TABLE 2.

TABLE 2

| surface | K | $A_4$ | $A_6$ | $A_8$ | $A_{10}$ |
|---|---|---|---|---|---|
| #5 | 0.00 | $2.06 \times 10^{-6}$ | $1.84 \times 10^{-10}$ | $-1.27 \times 10^{-13}$ | 0.000 |

Surface #4 is a diffractive surface 21a, which is configured to have a diffractive lens structure, which is expressed by a predetermined OPD function, formed on a base curve which is a rotationally symmetrical aspherical surface. The aspherical surface defining the base curve of the diffractive surface 21a is expressed by the equation (i). The conical coefficient, aspherical coefficients, and coefficients of the OPD function defining the diffractive lens structure are indicated in TABLE 3. It should be noted that a focal length of the diffractive lens structure for the wavelength of 780 nm is 4578.8 mm, and the blaze wavelength λB is 725 nm.

TABLE 3

| K | 0.00 |
|---|---|
| A4 | $2.58 \times 10^{-6}$ |
| A6 | $-3.98 \times 10^{-12}$ |
| A8 | $-1.41 \times 10^{-13}$ |
| A10 | 0.00 |
| D | $3.89 \times 10^{-5}$ |
| P2 | $-1.40 \times 10^{-1}$ |
| P4 | $2.04 \times 10^{-5}$ |
| P6 | $-1.31 \times 10^{-8}$ |
| P8 | 0.00 |
| P10 | 0.00 |

According to the above example, the diffraction efficiency at the first wavelength 680 nm is 98.4%, and the diffraction efficiency at the second wavelength 780 nm is 98.4%.

Surface #8 is configured such that it has an aspherical surface having no rotation axis, and that the radius of curvature in the auxiliary scanning direction is designed regardless of the cross-sectional shape in the main scanning direction. This surface will be referred to as an anamorphic aspherical surface.

The cross-sectional shape in the main scanning direction $X(y)$ is obtained by the equation (v). The radius of curvature $rz(y)$ in the auxiliary scanning direction at a position y along the main scanning direction is expressed by equation (vi) with the radius of curvature in the auxiliary scanning direction at the optical axis being $rz_o$.

$$X(y) = \frac{y^2}{r\left(1 + \sqrt{1 - \frac{(\kappa+1)y^2}{r^2}}\right)} + A4y^4 + A6y^6 + A8y^8 + A10y^{10} \quad (v)$$

$$\frac{1}{rz(y)} = \frac{1}{rz_o} + B1y + B2y^2 + B3y^3 + B4y^4 + B5y^5 + B6y^6 \quad (vi)$$

Coefficients defining surface #8 are indicated in TABLE 4.

TABLE 4

| K | 0.00 |
|---|---|
| A4 | $3.41 \times 10^{-8}$ |
| A6 | $-8.67 \times 10^{-13}$ |
| A8 | $1.32 \times 10^{-17}$ |
| A10 | 0.00 |
| B1 | $-1.38 \times 10^{-6}$ |
| B2 | $-3.06 \times 10^{-7}$ |
| B3 | 0.00 |
| B4 | $1.45 \times 10^{-12}$ |
| B5 | 0.00 |
| B6 | $2.54 \times 10^{-16}$ |

FIG. 3A is a graph showing an fθ error of the scanning optical system 100 (i.e., a deviation amount of a position of the beam spot with respect to an ideal position). FIG. 3B is a graph showing curvature of field. The error in the main scanning direction is indicated by broken lines, and the error in the auxiliary scanning direction is indicated by a solid line. FIG. 3C is a graph showing a difference between lateral chromatic aberrations for the first and second wavelengths of the scanning optical system 100. Specifically, the graph shows a relative position of a beam spot formed by the first beam (680 nm) with respect to a position of the beam spot formed by the second beam (780 nm) on the surface 40 in the main scanning direction at respective image height Y (unit: mm), which is measured from the optical axis Ax1, and a side where the laser diode 10 is arranged is indicated as a negative side, and the opposite side is indicated as a positive side.

Second Embodiment

FIG. 4 schematically shows a plan view of a scanning optical system 200 according to a second embodiment. Since the arrangement of the optical elements are similar to that of the first embodiment, similar reference numerals are given to the elements similar to those used in the first embodiment, and description thereof will not be repeated.

The scanning lens employed in the scanning optical system 200 has a positive power as a whole, and is a two-wavelength compatible lens that is optimized for both a laser beam having a first wavelength (660 nm) and another laser beam having a second wavelength (780 nm).

A numerical example of the scanning optical system 200 according to the second embodiment is described.

TABLE 5 indicates a numerical structure of the scanning optical system 200, from a cylindrical lens 12 to the surface 40 to be scanned.

TABLE 5

| | f: 280.0 mm | | scanning width: 320 mm | | |
|---|---|---|---|---|---|
| Surface number | ry | rz | d | n780 | n660 |
| #1 | inf. | 50.0 | 4.00 | 1.51072 | 1.51374 |
| #2 | inf. | — | 97.00 | | |
| #3 | inf. | — | 46.00 | | |
| #4 | −88.80 | — | 7.00 | 1.51921 | 1.52234 |
| #5 | −88.80 | — | 2.00 | | |
| #6 | inf. | — | 15.00 | 1.51072 | 1.51374 |
| #7 | −159.60 | — | 165.20 | | |
| #8 | −882.40 | 39.12 | 8.00 | 1.48617 | 1.48908 |
| #9 | −1882.40 | — | 109.60 | | |

Surface #1 is a cylindrical surface, surfaces #2, #3, #6 are planner surfaces, and surfaces #7 and #9 are spherical surfaces. Surface #5 is a rotationally symmetrical aspherical surface, and the conical coefficient and the spherical coefficients for the surface #5 are indicated in TABLE 6.

TABLE 6

| surface | K | $A_4$ | $A_6$ | $A_8$ | $A_{10}$ |
|---|---|---|---|---|---|
| #5 | 0.00 | $2.06 \times 10^{-6}$ | $1.76 \times 10^{-10}$ | $-1.02 \times 10^{-13}$ | 0.000 |

Surface #4 is a diffractive surface 21a, which is configured to have a diffractive lens structure, which is expressed by a predetermined OPD function, formed on a base curve which is a rotationally symmetrical aspherical surface. The aspherical surface defining the base curve of the diffractive surface 21a is expressed by the equation (i). The conical coefficient, aspherical coefficients, and coefficients of the OPD function defining the diffractive lens structure are indicated in TABLE 7. It should be noted that a focal length of the diffractive lens structure for the wavelength of 780 nm is 4331.3 mm, and the blaze wavelength λB is 713 nm.

TABLE 7

| K | 0.00 |
|---|---|
| A4 | $2.60 \times 10^{-6}$ |
| A6 | $-1.73 \times 10^{-11}$ |
| A8 | $-1.07 \times 10^{-13}$ |
| A10 | 0.00 |
| D | $3.70 \times 10^{-5}$ |
| P2 | $-1.48 \times 10^{-1}$ |
| P4 | $2.77 \times 10^{-5}$ |
| P6 | $-1.67 \times 10^{-8}$ |
| P8 | 0.00 |
| P10 | 0.00 |

According to the above example, the diffraction efficiency at the first wavelength 660 nm is 97.6%, and the diffraction efficiency at the second wavelength 780 nm is 97.6%.

Surface #8 is an anamorphic aspherical surface. Coefficients for equations (v) and (vi) defining surface #8 are indicated in TABLE 8.

TABLE 8

| K | 0.00 |
|---|---|
| A4 | $3.87 \times 10^{-8}$ |
| A6 | $-1.08 \times 10^{-12}$ |
| A8 | $2.01 \times 10^{-17}$ |

TABLE 8-continued

| | |
|---|---|
| A10 | 0.00 |
| B1 | $-1.29 \times 10^{-6}$ |
| B2 | $-3.28 \times 10^{-7}$ |
| B3 | 0.00 |
| B4 | $-1.08 \times 10^{-12}$ |
| B5 | 0.00 |
| B6 | $2.70 \times 10^{-16}$ |

FIG. 5A is a graph showing an fθ error of the scanning optical system 200, FIG. 5B is a graph showing curvature of field, and FIG. 5C is a graph showing a difference between lateral chromatic aberrations for the first and second wavelengths of the scanning optical system 200.

Third Embodiment

FIG. 6 schematically shows a plan view of a scanning optical system 300 according to a third embodiment. Since the arrangement of the optical elements are similar to that of the first embodiment, similar reference numerals are given to the elements similar to those used in the first embodiment, and description thereof will not be repeated.

The scanning lens employed in the scanning optical system 300 has a positive power as a whole, and is a two-wavelength compatible lens that is optimized for both a laser beam having a first wavelength (650 nm) and another laser beam having a second wavelength (780 nm).

A numerical example of the scanning optical system 300 according to the third embodiment is described.

TABLE 9 indicates a numerical structure of the scanning optical system 300, from a cylindrical lens 12 to the surface 40 to be scanned.

TABLE 9

| | f: 280.0 mm | | scanning width: 320 mm | | |
|---|---|---|---|---|---|
| Surface number | ry | rz | d | n780 | n650 |
| #1 | inf. | 50.0 | 4.00 | 1.51072 | 1.51405 |
| #2 | inf. | — | 97.00 | | |
| #3 | inf. | — | 46.00 | | |
| #4 | −83.70 | — | 7.00 | 1.48617 | 1.48940 |
| #5 | −85.80 | — | 2.00 | | |
| #6 | inf. | — | 14.00 | 1.76591 | 1.77664 |
| #7 | −241.90 | — | 165.20 | | |
| #8 | −1378.00 | 40.00 | 8.00 | 1.48617 | 1.48940 |
| #9 | −1858.50 | — | 113.60 | | |

Surface #1 is a cylindrical surface, surfaces #2, #3, #6 are planner surfaces, and surfaces #7 and #9 are spherical surfaces. Surface #5 is a rotationally symmetrical aspherical surface, and the conical coefficient and the spherical coefficients for the surface #5 are indicated in TABLE 10.

TABLE 10

| surface | K | $A_4$ | $A_6$ | $A_8$ | $A_{10}$ |
|---|---|---|---|---|---|
| #5 | 0.00 | $2.32 \times 10^{-6}$ | $3.16 \times 10^{-10}$ | $-1.75 \times 10^{-13}$ | 0.000 |

Surface #4 is a diffractive surface 21a, which is configured to have a diffractive lens structure, which is expressed by a predetermined OPD function, formed on a base curve which is a rotationally symmetrical aspherical surface. The aspherical surface defining the base curve of the diffractive surface 21a is expressed by the equation (i). The conical coefficient, aspherical coefficients, and coefficients of the OPD function defining the diffractive lens structure are indicated in TABLE 11. It should be noted that a focal length of the diffractive lens structure for the wavelength of 780 nm is 2648.9 mm, and the blaze wavelength λB is 705 nm.

TABLE 11

| | |
|---|---|
| K | 0.00 |
| A4 | $2.78 \times 10^{-6}$ |
| A6 | $2.58 \times 10^{-10}$ |
| A8 | $-2.24 \times 10^{-13}$ |
| A10 | 0.00 |
| D | $3.66 \times 10^{-5}$ |
| P2 | $-2.42 \times 10^{-1}$ |
| P4 | $-5.95 \times 10^{-5}$ |
| P6 | $3.79 \times 10^{-8}$ |
| P8 | 0.00 |
| P10 | 0.00 |

According to the above example, the diffraction efficiency at the first wavelength 650 nm is 97.2%, and the diffraction efficiency at the second wavelength 780 nm is 97.0%.

Surface #8 is an anamorphic aspherical surface. Coefficients for equations (v) and (vi) defining surface #8 are indicated in TABLE 12.

TABLE 12

| | |
|---|---|
| K | 0.00 |
| A4 | $3.52 \times 10^{-8}$ |
| A6 | $-9.68 \times 10^{-13}$ |
| A8 | $1.71 \times 10^{-17}$ |
| A10 | 0.00 |
| B1 | $-1.43 \times 10^{-6}$ |
| B2 | $-2.99 \times 10^{-7}$ |
| B3 | 0.00 |
| B4 | $-3.54 \times 10^{-12}$ |
| B5 | 0.00 |
| B6 | $3.55 \times 10^{-16}$ |

FIG. 7A is a graph showing an fθ error of the scanning optical system 300, FIG. 7B is a graph showing curvature of field, and FIG. 7C is a graph showing a difference between lateral chromatic aberrations for the first and second wavelengths of the scanning optical system 300.

TABLE 13 shows conditions (1)–(3) of each embodiment. As understood from TABLE 13, in each embodiment, conditions (1), (2) and (3) are satisfied, and thus, the lateral chromatic aberration is well compensated for and the diffraction efficiency is maintained at high ratio.

TABLE 13

| | 1st embodiment | 2nd embodiment | 3rd embodiment |
|---|---|---|---|
| condition (1) | 16.35 | 15.49 | 9.46 |
| condition (2) | 57.4 | 52.1 | 57.4 |
| condition (3) | 725 | 713 | 705 |
| lower limit | 680 | 660 | 650 |
| upper limit | 730 | 720 | 715 |

According to the invention, it becomes possible that the same scanning lens is used for both of the first wavelength and second wavelength. That is, at least for two design wavelengths, the same scanning lens can be used. Therefore, designing cost and manufacturing cost can be suppressed.

The present disclosure relates to the subject matter contained in Japanese Patent Application No. 2001-025205, filed on Feb. 1, 2001, which is expressly incorporated herein by reference in its entirety.

What is claimed is:

1. A scanning lens which converges a beam deflected by a deflector on a surface to be scanned, comprising:

at least one refractive lens; and a diffractive lens structure formed on at least one surface of said at least one refractive lens and configured to compensate for lateral chromatic aberration, said scanning lens being configured to satisfy condition:

$$9.0 < fd/f < 17.0,$$

wherein fd is a focal length of said at least one diffractive lens structure, f is a focal length of said scanning lens as a whole including said at least one diffractive lens structure and said at least one refractive lens, wherein said scanning lens is configured so that lateral chromatic aberration is compensated for both of a first wavelength and a second wavelength which is different from the first wavelength.

2. The scanning lens according to claim 1,
the first wavelength being included in a red range,
the second wavelength being included in an infrared range,
a difference between the first and second wavelengths being substantially 100 nm or more.

3. The scanning lens according to claim 1, wherein Abbe number νd of said refractive lens on which said at least one diffractive lens structure is formed is greater than 50.

4. The scanning lens according to claim 1, wherein a blaze wavelength of said at least one diffractive lens structure $\lambda B$ satisfies condition:

$$\lambda 1 < \lambda B < (\lambda 1 + \lambda 2)/2,$$

wherein $\lambda 1$ is the first wavelength, and $\lambda 2$ is the second wavelength.

* * * * *